W. RULISON.
APPARATUS FOR DELIVERING MEASURED QUANTITIES OF MATERIAL.
APPLICATION FILED NOV. 30, 1908.
936,170.
Patented Oct. 5, 1909.
2 SHEETS—SHEET 1.
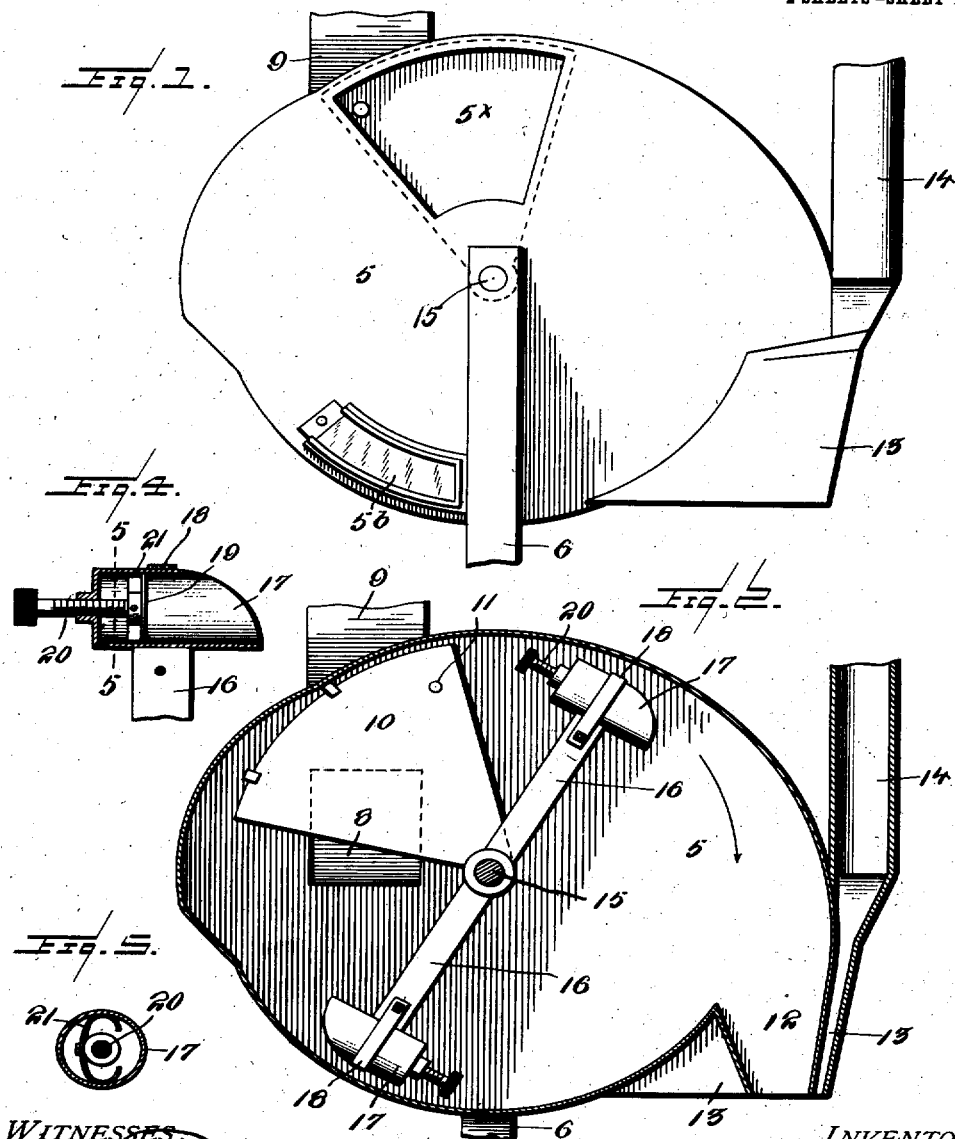

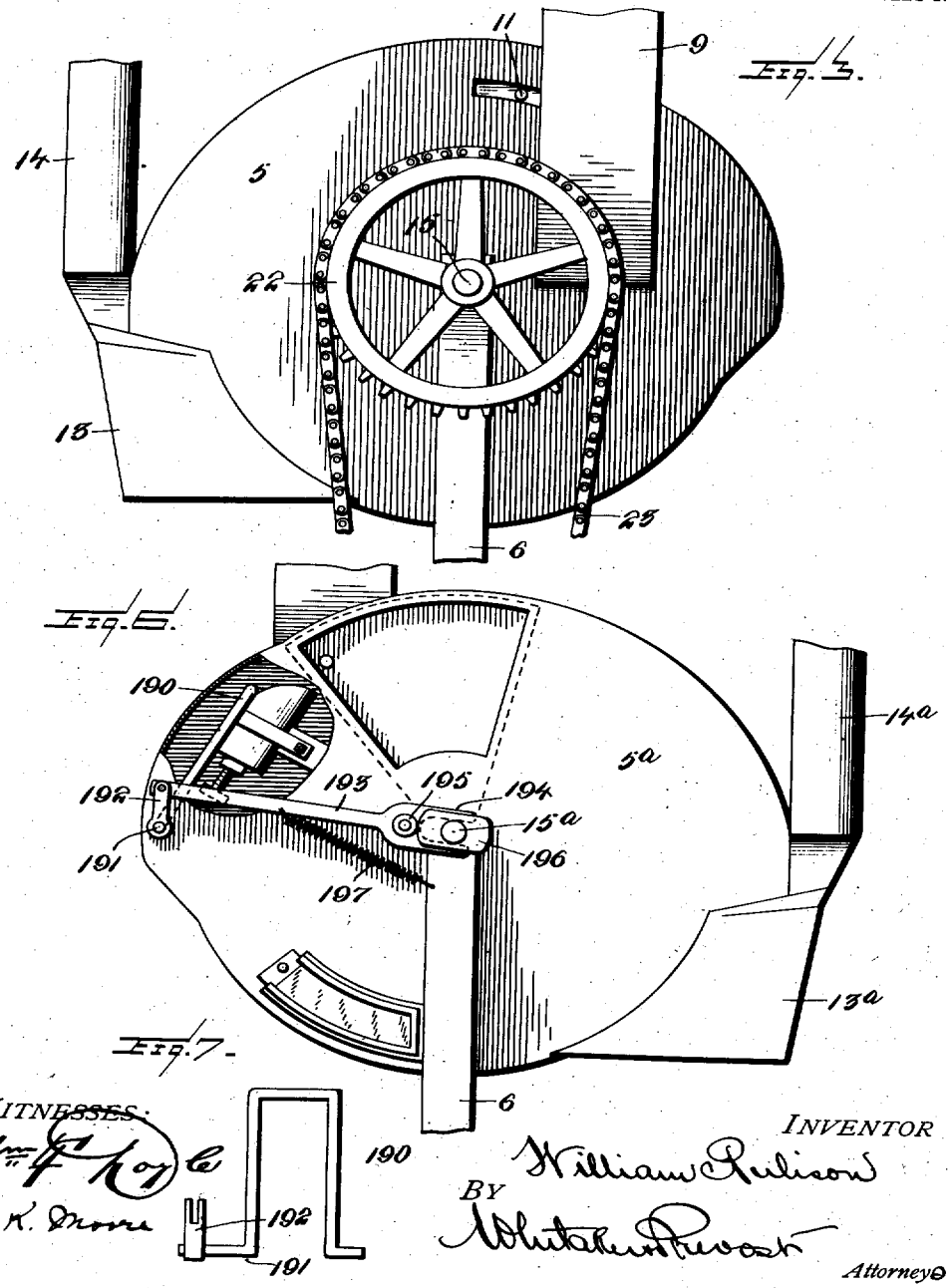

UNITED STATES PATENT OFFICE.

WILLIAM RULISON, OF JOHNSTOWN, NEW YORK, ASSIGNOR, BY MESNE ASSIGNMENTS, OF TWO-THIRDS TO ROSE M. KNOX, EXECUTRIX OF CHAS. B. KNOX, DECEASED, CHARLES M. KNOX, 2D, AND JAMES E. KNOX, ALL OF JOHNSTOWN, NEW YORK.

APPARATUS FOR DELIVERING MEASURED QUANTITIES OF MATERIAL.

936,170.     Specification of Letters Patent.     Patented Oct. 5, 1909.

Original application filed July 13, 1908, Serial No. 443,241. Divided and this application filed November 30, 1908. Serial No. 465,118.

*To all whom it may concern:*

Be it known that I, WILLIAM RULISON, citizen of the United States, residing at Johnstown, in the county of Fulton and State of New York, have invented certain new and useful Improvements in Apparatus for Delivering Measured Quantities of Material; and I do hereby declare the following to be a full, clear, and exact description of the invention, such as will enable others skilled in the art to which it appertains to make and use the same.

This invention consists in the novel features hereinafter described, reference being had to the accompanying drawings which illustrate one form in which I have contemplated embodying my invention and the invention is fully disclosed in the following specification and claims.

This application is a division of my former application for Letters Patent of the United States for improvements in bag filling and sealing machine, filed July 13, 1908, and given Serial Number 443,241 and covers specifically the mechanism for delivering measured quantities of material, therein shown and described.

Referring to the drawings: Figure 1 is a side elevation of a device for delivering measured quantities of material embodying my invention. Fig. 2 is a vertical sectional view of the same. Fig. 3 is a view similar to Fig. 1 showing the opposite side of the apparatus. Fig. 4 is a detail sectional view of a part of the measuring device somewhat enlarged and the adjusting device for varying the capacity thereof. Fig. 5 is a transverse sectional view on line 5—5 of Fig. 4. Fig. 6 is a view similar to Fig. 1, a part of the hopper being broken away and showing a modification. Fig. 7 is a detail view of the leveling device or bail shown in Fig. 6.

In the drawings I have shown my improved measuring and delivering device in the form best adapted for use in connection with my improved bag filling machine, shown in my former application, before referred to.

In the drawings, in which the several parts are indicated by numerals, 5 represents a hopper for containing the material, and which is supported in any suitable manner, as by braces 6, 6 extending from the frame of a bag filling machine.

The hopper is provided with an aperture 8 on one side communicating with a supply pipe 9, through which the material is introduced, and the supply aperture 8 is controlled by a sliding gate 10, operable from the interior of the hopper by means of a projection 11. The projection 11 also preferably extends through a slot $11^a$ in the back of the hopper to enable the gate 10 to be adjusted from the outside if desired. The gate 10 is held frictionally in its adjusted positions. The front wall of the hopper is provided with a swinging door $5^x$ covering an aperture through which access can be had to the interior to adjust gate 10, or the measuring cups hereinafter described. I also prefer to provide a transparent panel $5^b$ in the hopper as shown so that the operator can see if material is in the hopper. The hopper is also provided with a downwardly directed tangential discharge spout 12, which is preferably surrounded by an exterior casing 13, connected with an air pipe 14, communicating with an air exhausting device, for withdrawing any dust which may arise from the filling of the bags.

A horizontal shaft 15 extends through the side walls of the hopper and is provided with a plurality of radial arms 16, two being shown, carrying at their outer ends adjustable measuring scoops or buckets 17, secured to the ends of said arms by straps 18, or in any other desired way. The scoops or buckets are best shown in Figs. 2, 4 and 5 and consist each of a cylindrical shaped vessel closed at one end and having its walls projecting farther on the side adjacent to the shaft than at other portions. Each scoop is preferably provided with a false bottom 19, adjustable by means of a screw 20, to vary the capacity of the vessel, and the screw 20 is preferably provided with a friction spring or brake 21 (see Figs. 4 and 5) which binds against the wall of the vessel, and holds the screw in its adjusted position. Each of said scoops or measuring receptacles, as will be seen, has its mouth facing at an angle (and in this case at right angles) to a radial line passing through the axis of rotation of the shaft 15.

The shaft 15 is provided with suitable mechanism for imparting rotary motion thereto, in the direction indicated by the arrow in Fig. 2, and I prefer to have said shaft, carrying the measuring cups rotated intermittently as described in my former application, before referred to. In the drawings I have shown the shaft 15 provided with a sprocket wheel 22, engaging a driving sprocket chain 23, actuated by suitable mechanism (not shown) and which may be similar to that shown in my former application for imparting rotary motion intermittently thereto.
The material to be measured and delivered is supplied to the tube 9, leading to the hopper 5 continuously or at intervals, in any desired manner, and finds its way by gravity into the bottom of the hopper, being regulated by the gate 10. The rotation of the cups 17—17 causes them to fill themselves as they pass through the lower part of the hopper and to discharge measured quantities of the material through the discharge aperture 12.

The transparent panel 5$^b$ which, as shown, extends from the lowermost point of the hopper, upward enables the operator to see the level of the material in the hopper at all times, and by opening the door 5$^a$ the operator may adjust the capacity of the cups by turning the screws 20, and may also adjust the gate 10 as previously described.

Any dust contained in the material when it is delivered by the spout 12, will be drawn into the passage 13, and removed by suction through pipe 14.

In some instances where it is desired to fill the bags with a measured quantity of a material which is apt to pile up at the mouth of the measuring cups or vessels and cause slightly unequal amounts to be delivered thereby, I employ the device shown in Figs. 6 and 7 to equalize the quantity in the measuring cups or vessels as far as possible. This consists of a scraper or leveler 190 in the form of a bail mounted on a rock shaft 191 extending through the hopper (here numbered 5$^a$) and provided with an arm 192 connected pivotally with a bar 193 having a forked end 194 to engage the shaft 15$^a$ to guide it, and a stud or roll 195 to engage a double cam 196 on the said shaft, a spring 197 serving to retract said bar 193 and hold the roll in engagement with the cam. As each of the measuring cups or vessels passes the bail 190 the latter is operated by the action of the spring and cam to sweep over the top of the cup, and scrape off any surplus material which falls to the bottom of the hopper 5$^a$, thus insuring an even feed of the material which can be accurately regulated by adjusting the capacity of the cups as before described, said cups being identical in construction with those previously described.

I do not desire to be limited to the exact details of construction herein described and shown as slight variations may be made therein without departing from the invention.

What I claim and desire to secure by Letters Patent is:—

1. The combination with a hopper, provided with a tangential discharge, of a rotary measuring device, for transferring portions of the contents of the hopper to said discharge spout, having its mouth facing in a direction at an angle to a radial line from its axis of rotation, and a leveling device movable across the mouth of said measuring device for removing superfluous material projecting above the same, substantially as described.

2. The combination with a hopper provided with a tangential discharge, of a rotary device within the hopper, a measuring receptacle carried thereby having its mouth facing in a direction at an angle to a radial line from its axis of rotation, a leveling device capable of moving across the mouth of said measuring receptacle, and actuating means for said leveling device, substantially as described.

3. The combination with a hopper provided with a tangential discharge, of a rotary device within the hopper, a measuring receptacle carried thereby having its mouth facing in a direction at an angle to a radial line from its axis of rotation, means for adjusting the capacity of said receptacle, and a leveling device movable across the mouth of said receptacle for removing superfluous material projecting above the same, substantially as described.

4. The combination with a hopper provided with a tangential discharge, of a rotary device within said hopper, a plurality of measuring receptacles, carried thereby, each having its mouth facing in a direction at an angle to a radial line from the axis of rotation of said rotary part, a single leveling device located adjacent to the path of said receptacles and having a part adapted to be moved across the mouth of each of the same, and means for actuating said leveling device, substantially as described.

5. The combination with a hopper provided with a tangential discharge, of a rotary device within said hopper, a plurality of measuring receptacles carried thereby, each having its mouth facing in a direction at an angle to a radial line from the axis of rotation of said rotary device, a single leveling device located in the hopper adjacent to the path of said receptacles, and having a part adapted to be moved across the mouths of the same, a rotary actuating device operatively connected with said rotary part, and connections between said rotary actuating device and said leveling device, substantially as described.

6. The combination with a hopper provided with a discharge spout, of a rotary measuring device in said hopper, a leveling device mounted in said hopper and having a part adapted to be moved across the path of said rotary device, and means for actuating said leveling device, substantially as described.

7. The combination with a hopper provided with a discharge spout, a rotary device in said hopper, a measuring receptacle carried thereby, a pivoted leveling bail having portions adapted to swing across the path of said receptacle, a rotating cam connected with said rotary device and mechanism interposed between said cam and said bail for operating said bail, substantially as described.

8. The combination with the hopper provided with a discharge spout, a rotary device in said hopper, a measuring receptacle carried thereby, an adjustable bottom for said measuring receptacle, an adjusting screw for operating said adjustable bottom, and a spring secured to said screw within said receptacle, and frictionally engaging the walls of said receptacle for holding the screw in adjusted position, substantially as described.

In testimony whereof I affix my signature, in the presence of two witnesses.

WILLIAM RULISON.

Witnesses:
FRED. LINUS CARROLL,
MABEL G. MOVIELL.

---

Correction in Letters Patent No. 936,170.

It is hereby certified that the first-mentioned assignee in Letters Patent No. 936,170, granted October 5, 1909, upon the application of William Rulison, of Johnstown, New York, for an improvement in "Apparatus for Delivering Measured Quantities of Material," should have been described and specified as *Rose M. Knox*, instead of "Rose M. Knox, executrix of Charles B. Knox, deceased;" and that the said Letters Patent should be read with this correction therein that the same may conform to the record of the case in the Patent Office.

Signed and sealed this 19th day of October, A. D., 1909.

[SEAL.]

C. C. BILLINGS,
*Acting Commissioner of Patents.* of the same, a rotary actuating device operatively connected with said rotary part, and connections between said rotary actuating device and said leveling device, substantially as described.

6. The combination with a hopper provided with a discharge spout, of a rotary measuring device in said hopper, a leveling device mounted in said hopper and having a part adapted to be moved across the path of said rotary device, and means for actuating said leveling device, substantially as described.

7. The combination with a hopper provided with a discharge spout, a rotary device in said hopper, a measuring receptacle carried thereby, a pivoted leveling bail having portions adapted to swing across the path of said receptacle, a rotating cam connected with said rotary device and mechanism interposed between said cam and said bail for operating said bail, substantially as described.

8. The combination with the hopper provided with a discharge spout, a rotary device in said hopper, a measuring receptacle carried thereby, an adjustable bottom for said measuring receptacle, an adjusting screw for operating said adjustable bottom, and a spring secured to said screw within said receptacle, and frictionally engaging the walls of said receptacle for holding the screw in adjusted position, substantially as described.

In testimony whereof I affix my signature, in the presence of two witnesses.

WILLIAM RULISON.

Witnesses:
FRED. LINUS CARROLL,
MABEL G. MOVIELL.

---

Correction in Letters Patent No. 936,170.

It is hereby certified that the first-mentioned assignee in Letters Patent No. 936,170, granted October 5, 1909, upon the application of William Rulison, of Johnstown, New York, for an improvement in "Apparatus for Delivering Measured Quantities of Material," should have been described and specified as *Rose M. Knox*, instead of "Rose M. Knox, executrix of Charles B. Knox, deceased;" and that the said Letters Patent should be read with this correction therein that the same may conform to the record of the case in the Patent Office.

Signed and sealed this 19th day of October, A. D., 1909.

[SEAL.]
C. C. BILLINGS,
*Acting Commissioner of Patents.*

It is hereby certified that the first-mentioned assignee in Letters Patent No. 936,170, granted October 5, 1909, upon the application of William Rulison, of Johnstown, New York, for an improvement in "Apparatus for Delivering Measured Quantities of Material," should have been described and specified as *Rose M. Knox,* instead of "Rose M. Knox, executrix of Charles B. Knox, deceased;" and that the said Letters Patent should be read with this correction therein that the same may conform to the record of the case in the Patent Office.

Signed and sealed this 19th day of October, A. D., 1909.

[SEAL.]

C. C. BILLINGS,
*Acting Commissioner of Patents.*